US012231424B2

United States Patent
Sonna Momo et al.

(10) Patent No.: US 12,231,424 B2
(45) Date of Patent: Feb. 18, 2025

(54) METHOD, ELECTRONIC IDENTITY OBJECT, AND TERMINAL FOR RECOGNIZING AND/OR IDENTIFYING A USER

(71) Applicant: GLOBAL ID SA, Lausanne (CH)

(72) Inventors: Lambert Sonna Momo, Romont (CH); Fatih Balli, Morges (CH); Serge Vaudenay, Crissier (CH); Betül Durak, Pittsburgh, PA (US)

(73) Assignee: GLOBAL ID SA, Lausanne (CH)

( * ) Notice: Subject to any disclaimer, the term of this patent is extended or adjusted under 35 U.S.C. 154(b) by 274 days.

(21) Appl. No.: 17/601,694

(22) PCT Filed: Apr. 5, 2020

(86) PCT No.: PCT/IB2020/053243
§ 371 (c)(1),
(2) Date: Oct. 5, 2021

(87) PCT Pub. No.: WO2020/202118
PCT Pub. Date: Oct. 8, 2020

(65) Prior Publication Data
US 2023/0094432 A1 Mar. 30, 2023

(30) Foreign Application Priority Data

Apr. 5, 2019 (CH) .................................... 00469/19
Jun. 17, 2019 (CH) .................................... 00807/19

(51) Int. Cl.
*H04L 29/06* (2006.01)
*H04L 9/32* (2006.01)
*H04L 9/40* (2022.01)

(52) U.S. Cl.
CPC ........ *H04L 63/0861* (2013.01); *H04L 9/3231* (2013.01); *H04L 9/3247* (2013.01); *H04L 63/0435* (2013.01); *H04L 63/126* (2013.01)

(58) Field of Classification Search
CPC ........ G06F 21/32; G06F 21/44; G06F 21/445; G06F 21/62; G06F 21/6209;
(Continued)

(56) References Cited

U.S. PATENT DOCUMENTS

2008/0195858 A1 8/2008 Nguyen
2015/0143511 A1 5/2015 Vujic et al.
(Continued)

FOREIGN PATENT DOCUMENTS

WO WO-2006/122433 A1 5/2006

OTHER PUBLICATIONS

International Search Report and Written Opinion for PCT/IB2020/053243 dated Jul. 17, 2020, 11 pages.
(Continued)

*Primary Examiner* — Malcolm Cribbs
(74) *Attorney, Agent, or Firm* — BLANK ROME LLP

(57) ABSTRACT

A method for recognizing and/or identifying a user (9) with a chip (C) in an electronic identity object storing a digital identity (24), the method comprising steps of: —establishing a wireless or electrical connection between the electronic identity object (C) and a verification terminal (T); —verifying, in the electronic identity object, if the verification terminal is authorized to communicate with the electronic identity object (C), and in response of a positive verification sharing a secret (K): using the shared secret (K) for establishing an encrypted symmetric data link (5) between the electronic identity object and the verification terminal (T); transmitting, through the encrypted data link (5), said digital identity (24) stored in the electronic identity object to the
(Continued)

verification terminal (T); and verifying in the verification terminal (T) the authenticity of said digital identity (24).

20 Claims, 10 Drawing Sheets

(58) Field of Classification Search
CPC ............ G06F 21/6218; G06F 21/6245; H04L 63/0861; H04L 9/3231; H04L 9/3247; H04L 63/0435; H04L 63/126; H04L 63/045; H04L 63/0869; H04L 63/205
See application file for complete search history.

(56) References Cited

U.S. PATENT DOCUMENTS

| | | | |
|---|---|---|---|
| 2015/0213079 A1* | 7/2015 | Shukla | G06F 21/6263 707/687 |
| 2016/0337131 A1* | 11/2016 | de Andrada | H04L 9/14 |
| 2017/0338951 A1* | 11/2017 | Fu | G06F 21/10 |

OTHER PUBLICATIONS

Gomez-Barrero, et al., "Multi-Biometric Template Protection Based on Homomorphic Encryption", Pattern Recognition, vol. 67, 2017, pp. 149-163.

* cited by examiner

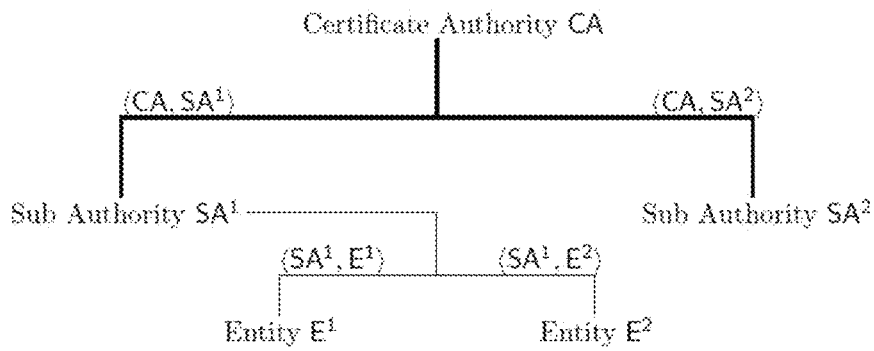

Figure 3a

$$\underline{\text{Kg}(\mathcal{G})\text{:}} \qquad \underline{\text{Sign}(\text{sk}, m)\text{:}} \qquad \underline{\text{Ver}(\text{vk}, m, \sigma)\text{:}}$$

1: $\text{sk} \leftarrow_\$ \mathbb{Z}_q^*$  1: $k \leftarrow_\$ \mathbb{Z}_q$  1: $\sigma \to (s, R)$ 2: $\text{vk} \leftarrow \text{sk} \cdot G$  2: $R \leftarrow k \cdot G$  2: $h \leftarrow H_1(m|R)$ 3: return (sk, vk)  3: $h \leftarrow H_1(m|R)$  3: $R' = s \cdot G + h \cdot \text{vk}$ 4: $s \leftarrow k - \text{sk} \cdot h$  4: if $R' = R$ then

5: $s \leftarrow s \bmod q$  5: return true

6: $\sigma \leftarrow (s, R)$  6: return $[R' = R]$

7: return $\sigma$

Figure 3b

| The front cover | |
|---|---|
| pwd | weak access control password |
| $DG_1$ : public data | |
| $\mathcal{G}$ | curve domain parameters |
| CA-Term$_{pub}$ | the terminal authority's public key |
| Time-Srv$_{pub}$ | the time server's public key |
| $\ell$ | nonce length |
| $DG_2$ : semi-private data | |
| ID | identity info (full name etc.) |
| $u_{chip}$ | identifier value tied to $K_{chip}$ |
| $DG_3$ : private data | |
| BIO$_{ID}$ | biometric reference template |
| (CA-Ident, IS) | certificate chain of identity signer IS |
| $DG_4$ : chip-only data | |
| $\sigma_{DG_{2-3}}$ | signature over $DG_{2-3}$ |
| $K_{chip}$ | MAC key for confirmer data authentication |
| $G_{pwd2}, G_{pwd3}$ | precomputed pwd · $G_2$ and pwd · $G_3$ points |

Table 1: Data Groups

Figure 3c

Send(st, M):
1: st → ($K_{AE}$, $i_0$, $i_1$)
2: C ← Enc($K_{AE}$, $i_0$, ⊥, M)
3: st ← ($K_{AE}$, $i_0$ + 1, $i_1$)
4: return (st, C)

Recv(st, C):
1: st → ($K_{AE}$, $i_0$, $i_1$)
2: M ← Dec($K_{AE}$, $i_1$, ⊥, C)
3: if M = ⊥ then abort
4: st ← ($K_{AE}$, $i_0$, $i_1$ + 1)
5: return (st, M)

Figure 3g

$Init_b$(K):
1: $K_{AE}$ ← $H_4$(K|encode(1)); $IV_0$ ← $H_4$(K|encode(2))
2: $IV_1$ ← $H_4$(K|encode(3)); st ← ($K_{AE}$, $IV_b$, $IV_{\bar{b}}$)
3: return st

Figure 3h

METHOD, ELECTRONIC IDENTITY OBJECT, AND TERMINAL FOR RECOGNIZING AND/OR IDENTIFYING A USER

RELATED APPLICATIONS

This application is a national phase of PCT/IB2020/053243, filed on Apr. 5, 2020 which claims the benefit of Swiss Provisional Application No. 00469/19, filed on Apr. 5, 2019 and Swiss Application No. 00807/19, filed on Jun. 17, 2019. The entire contents of these applications are hereby incorporated by reference.

FIELD OF THE INVENTION

The present invention concerns a method, an object and a terminal for authenticating and/or identifying a user.

DESCRIPTION OF RELATED ART

Identification lies at the heart of our society. Official entities such as hospitals, governments, associations etc. all rely on the identification system provided by the state. Since it is often vital to determine who requests the service before being granted access, performing it securely deserves great diligence. The state as well as the society has a vested interest in secure identification system. Identity frauds, false-or-invalid recognition of people should happen scarcely, if not at all. Thanks to digital signatures, message authentication codes and public-key infrastructures; today's systems have mostly resolved the problems of identifying people securely.

However, the same cannot be said for privacy. Protecting user privacy is imperative to ensure that no malicious entity can misuse user data for exploitation. It helps individuals to maintain their autonomy and individuality. With recent revelations on government's relentless effort to track people, the public concern for privacy has grown enormously. More and more systems rely on the benefits of low-cost devices functioning as electronic identity documents such as driving licenses, residence cards, passports etc. These documents are typically designed with systems implemented on chips. The deficiencies imposed by these schemes do not always lie at incapability or ill-intention, but merely at lack of consideration of privacy as one of the primary goals.

Given that the government has to provide identity cards to its citizens, that may or may not contain sensitive biometric information, it is essential to have means in place that makes such cards unforgeable. This is in the interest of both the government and the private citizen, because it prevents cases of identity frauds. Furthermore, it needs to be ensured that any data collected by the authorities be inaccessible to any third party without the consent of the citizen. This prevents third parties from using data to exploit/target individuals. For example, such a scheme would prevent insurance companies from accessing private health-care records and deny/overcharge for medical benefits to a user on the basis of past medical history. Of course, there are other considerations that are equally necessary to safeguard user interests. For example, if a citizen uses an electronic identity card to gain access to a service by presenting it at a terminal, the transaction should be anonymous, and the transaction traffic should ideally not be able to leak any sensitive information. There are various other cryptographically significant notions that must be satisfied by the underlying protocols that are performed during each transaction.

Machine Readable Travel Documents (MRTD) standard addresses similar problems and allow a chip in the electronic travel document to communicate with a terminal through an authenticated and confidential channel (via PACE protocol), prove its genuineness (via PACE plus Chip Authentication Mode) and authenticity of its data (via classical signatures) to the terminal. Although skimming of chips are prevented with the help of secure memory, which contains a secret never revealed to the terminal, the identity and signature together can be leaked as an undeniable and publicly-provable data.

In the followings we sometimes refer to the electronic identity object, such as an identity document, containing an electronic circuit with an identity simply as "chip" C, while any device which supports the same contactless communication technology, such as NFC, is referred as terminal T. For example a terminal may be a smartphone, a computer, a tablet, or a dedicated identification terminal for identifying or authenticating users, for example at an access control point.

The proposed method preferably provides at least some of the following benefits:

(1) Privacy-sensitive biometric data is stored on chips/in personal user objects, but not on a central database. The data inside the personal object must also be clearly separated with clear boundaries based on the sensitivity level. For instance, biometric data requires stronger protection than the name of the owner.

(2) Arbitrary terminals should not be able to communicate with user personal objects, and the communication should be allowed only if the terminal can prove its authorization. Interactions from two different objects should look indistinguishable to unauthorized terminals.

(3) The self-authenticating data, e.g. signatures verifiable with a public key, of the identity preferably never leaves the user object. This authentication is preferably done via zero-knowledge interactive protocols.

(4) Any transferable proof leaving the user personal object preferably requires an involvement of the third-party called confirmer device for verification. These proofs should not be publicly-verifiable.

(5) Any biometric comparison is preferably done on the user personal object if computational resources permits. Otherwise the object must require a strong method of terminal authorization.

(6) Interactions should be deniable from the object perspective. No terminal should be able to store information which can be later used to prove a previous interaction of the object, e.g. the owner was at given location at some specific time.

However, an identification and/or recognition based a visual verification of the identification and the human characteristics provided by a personal card generally lacks robustness against:

a presentation of a false or an invalid personal card;
a presentation of a valid personal card with a modified identity and/or human characteristics;
a presentation of a valid personal card of a third person having similar human characteristics.

Identification and/or recognition systems relying on digital cards, digital signatures, message authentication codes, and public-key infrastructures, have been proposed. Those systems increase the robustness against identity theft and spoofing. However, they only provide a weak protection of the private personal data of the user against an unauthorized use, notably against access to identity stored in the card by unauthorized or malicious devices.

BRIEF SUMMARY OF THE INVENTION

An aim of the invention is to provide a secure identification and/or recognition of a user based on an electronic identity object that is more robust and secure than known systems.

Another aim is to provide a secure identification and/or recognition being enabled by an electronic identity object, such as a smart card, with limited computational and memory resources.

Another aim is to release the least possible amount of information from the electronic identity object to any terminal.

According to the invention, these aims are achieved by means of a method for recognizing and/or identifying a user with an electronic identity object storing a digital identity, the method comprising steps of:
  establishing a wireless or electrical connection between the electronic identity object and a verification terminal;
  verifying, in the electronic identity object, if the verification terminal is authorized to communicate with the electronic identity object, and in response of a positive verification sharing a secret:
    using the shared secret for establishing an encrypted symmetric data link between the electronic identity object and the verification terminal;
    transmitting, through the encrypted data link, said digital identity stored in the electronic identity object to the verification terminal; and
    verifying in the verification terminal the authenticity of said digital identity.

These aims are also achieved by means of an electronic identity object comprising a chip with following modules or elements:
  a connecting module over which a connection with a verification terminal can be established;
  a verification module for verifying if a connected verification terminal is authorized to communicate with the electronic identity object, and in response of a positive verification sharing a secret;
  an encryption module arranged for establishing an encrypted symmetric data link that uses the shared secret between the electronic identity object and the verification terminal;
  a memory for storing a digital identity;
  a transmission module for transmitting, through the encrypted data link, said digital identity (24) to the verification terminal.

The electronic identity object may store a biometric template.

An homomorphic encryption module may be provided for encrypting said biometric template and for decrypting the obtained matching result.

The invention is also related to a verification terminal for recognizing and/or identifying a user with an electronic identity object,
the verification terminal comprising:
  establishing a wireless or electrical connection between the electronic identity object and a verification terminal;
  a module for establishing an encrypted symmetric data link with said electronic identity object;
  a module for receiving, through the encrypted data link, a digital identity stored in the electronic identity object to the terminal; and
  a module for verifying the authenticity of said digital identity.

The terminal may include a module for matching an acquired biometric template with a homomorphically encrypted biometric template so as to generate a homomorphically encrypted result;
  a module for transmitting the homomorphically encrypted result to the electronic identity object through the encrypted data link.

The proposed solution provides a more robust and secure identification and/or recognition of the user.

An aim is also to provide a revocation mechanism to remove compromised terminals from the system.

In particular, the proposed method relies on transmitting data stored in the personal identity personal object (such as a smart card, an electronic identity card, a biometric passport, etc) to authorized terminals by means of an encrypted link. This avoids the leak of highly-sensitive data (such as identity, personal data, or biometric template), and the risk that malicious users access to this information with fake terminals or data sniffers.

Moreover, the proposed method can rely on low-cost, computationally-restrained (personal) electronic identity objects, such as a smart card (also called chip card or integrated circuit card—ICC), a biometric passport.

Privacy can be further increased by providing a matching between a biometric template of the user collected by the terminal and a reference biometric template 23 stored in the electronic identity object without disclosing the reference biometric template to the terminal. In one embodiment, the matching is executed in the chip C of the electronic identity object and uniquely the result is transmitted to the terminal. In another embodiment, the electronic identity object transmits a homomorphically encrypted biometric template so as to permit the terminal to execute the matching, the homomorphically encrypted result of the matching being provided to the electronic identity object which decrypts the outcome of this matching. This particular embodiment permits to reduce the computational requirements on the electronic identity object for performing the matching while guaranteeing privacy of stored data.

Moreover, the user's recognition and/or identification in the terminal comprises a verification of the authenticity of the electronic identity object, notably of information stored in the electronic identity object.

BRIEF DESCRIPTION OF THE DRAWINGS

The invention will be better understood with the aid of the description of an embodiment given by way of example and illustrated by the figures, in which:

FIG. 3a shows a public key infrastructure used with one certificate authority and several sub authorities;

FIG. 3b schematically illustrates possible algorithms used for the Schnorr signature. FIG. 3c is a Table indicating contents of data groups.

FIG. 3g schematically illustrates a possible variable-length authenticated encryption scheme AE which consists of two algorithm (Enc, Dec).

FIG. 3h schematically illustrates a possible algorithm $Init_b$.

DETAILED DESCRIPTION OF POSSIBLE EMBODIMENTS OF THE INVENTION

Example of System

Figure 1:
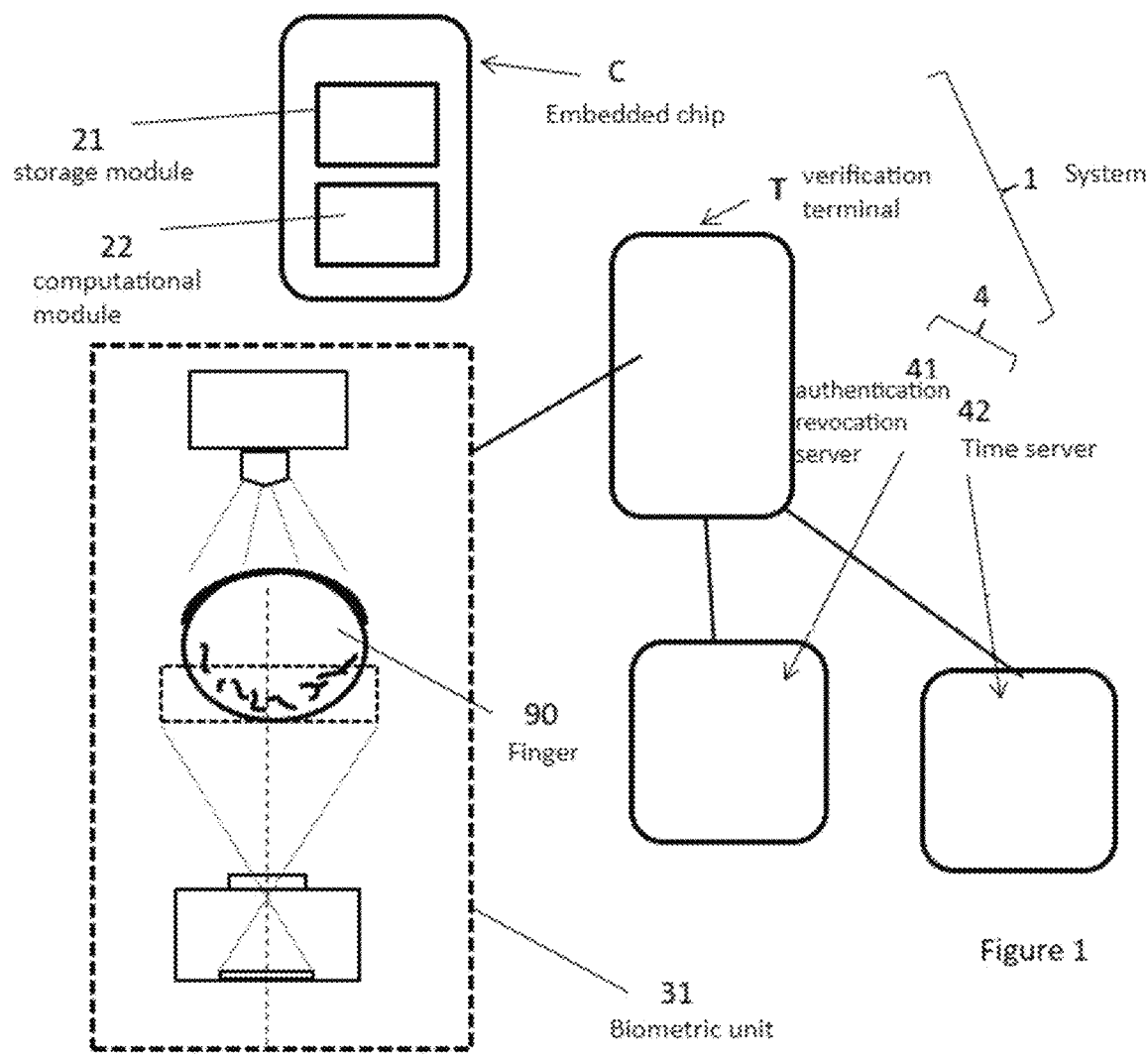
FIG. 1 shows a view of a system for recognizing and/or identifying a user, according to the invention.

FIG. 1 shows a view of a system 1 for recognizing and/or identifying a user. The system comprises an electronic identity object with an embedded chip C. One or more verification terminals T are provided for authenticating and/or identifying the holder of the electronic identity object C (i.e. the user) based on the presented object C.

The electronic identity object can be any portable object such as a user smart card, a biometric passport or ID card, an electronic driving licence, a transponder, etc.

The chip C is an electronic circuit with a wireless or contact interface which is attached to or embedded in the electronic identity object. It comprises a computational module 22 and a memory (storage module) 21 for providing storage of digital data. A transmission module 27 allows exchange of data with nearby verification terminals T over the link 5.

In one example, the memory 21 of the chip C may have 144 KB of EEPROM and 7.5 KB of RAM.

The computational module 22 comprises an encryption module 25 for establishing an encrypted link with a verification terminal T, for computing hashes, and for encrypting respectively decrypting data exchanged with a verification terminal T over the link 5. A homomorphic encryption module 28 can homomorphically encrypt data, such as a biometric template, and/or homomorphically decrypt data, such as homomorphically encrypted matching results. A verification module 26 is arranged for verifying if a connected verification terminal T is authorized to communicate with chip C and in response of a positive verification sharing a secret (K) stored in the memory 21.

The terminal T comprises a transmission module 37 for exchanging data over the encrypted link 5 with the chip C in the electronic identity object. It further comprises a computational module 32 with associated memory (not shown). The computational module 32 comprises an encryption module 33, a preprocessing module 34, a feature extraction module 35, a matching module 36 for matching an acquired biometric template with a homomorphically encrypted biometric template so as to generate a homomorphically encrypted result. The transmission module 37 is further arranged for transmitting the homomorphically encrypted result to the chip C through the encrypted data link 5. A module 38 is arranged for receiving a digital identity claimed by a connected chip. A module 39 is arranged for verifying the authenticity of this identity.

The verification terminal T further comprises or can access a biometric unit 31 for capturing biometric templates of the user of the electronic identity object. The biometric template may correspond for example to a fingerprint pattern, a vein pattern (such as a finger or wrist vein pattern), an iris pattern, a voice pattern, etc.

In a variant, the biometric unit 31 comprises a 2D biometric finger-vein reader with an infrared light source 310 and an infrared camera 311 attached to a processing unit, such as a microprocessor or a Raspberry Pi, that communicates through the WebSocket protocol. This reader can be used for acquiring user's biometric templates corresponding to vein patterns of a finger 90. Alternatively, a 3D finger-vein or wrist vein reader may be used, or any other biometric reader.

Both encryption modules 25, 33 can collaborate for encrypting and decrypting exchanged data. The protocol AES128 could be used for ciphering and deciphering data. The modules 25 and 33 can also compute hash functions, for example using SHA256. The modules 25 and 33 can also compute elliptic curves, for example using Secp-256r1.

The processing unit 32 in the verification terminal T may execute software modules in any suitable language, for example in standard java.

To decide whether two finger-vein images are from the same finger 90 of a user, three steps are needed. First is the preprocessing of the test image captured by the biometric reader 31, using the preprocessing module 34. Preprocessing may include aligning and cropping, brightness adaptation, and/or contrast adaptation.

In a second step, one needs to identify what belongs to the finger or to the background. This comprises a feature extraction, using the feature extraction module 35, for determining distinctive features from the preprocessed finger-vein images. The maximum curvature method may be used for this feature extraction. In a subsequent step, the extracted features of the test image captured by the sensor 31 in the terminal T are matched with corresponding features of a reference biometric template stored in the chip C (e.g. "cross-correlation"), in order to calculate an homomorphically encrypted result R ("matching score"). The matching may be performed with a matching module 36 based for example on Mirua Matching or a neural network. This result may be transmitted to the chip C over the encrypted data link 5.

The system 1 can also comprise one or more authentication and/or revocation servers 41 for managing terminal authorization and/or revocation. One or more time servers 42 can provide a reliable current time. A confirmer device Cnf can confirm the claimed identity of a chip C. The servers 31, 42, Cnf can communicate with the verification terminal T over secure interfaces.

Notation

We use $G=(p,a,b,G,G_2,G_3,q,h)$ to represent elliptic curves (EC) defined over $F_p$ with $y^2=x^3+ax+b$ such that G generates a group with a prime order q, and the cofactor is h. We use additive notation for groups. O denotes the neutral element and $\langle G \rangle$ denotes the subgroup generated by G. $G_2$, $G_3$ are additional generators uniformly sampled from $\langle G \rangle \setminus O$. We further assume that membership to this subgroup is easily verifiable, i.e. given a point R on the elliptic curve, we can decide whether $R \in \langle G \rangle$ by asserting $q \cdot R = O$.

We denote bitstring concatenation operator with "|". For encoding a field element x, we use fixed-length encoding, i.e. each $x \in F_p$ is mapped to $\log_2 p$ bits exactly by left-padding with zeros. In our notation, we omit this conversion and leave it implicit, e.g. H(x) means binary-encoding of the field element x is fed to hash function H. Similarly, conversions from bitstrings to integers are implicit. We assume that a point R on the elliptic curve is represented by (x,y). We consider the binary encoding of R as the concatenation of x and y as bitstrings. We denote with $(R)_x$ the x-coordinate of the point R on the elliptic curve. With $x \leftarrow_s D$, we mean that x is uniformly sampled from the domain D. With $x \leftarrow_s A(y)$, we mean that the algorithm A takes y as input along with some implicit random coins and returns x as an output.

Figure 3D:
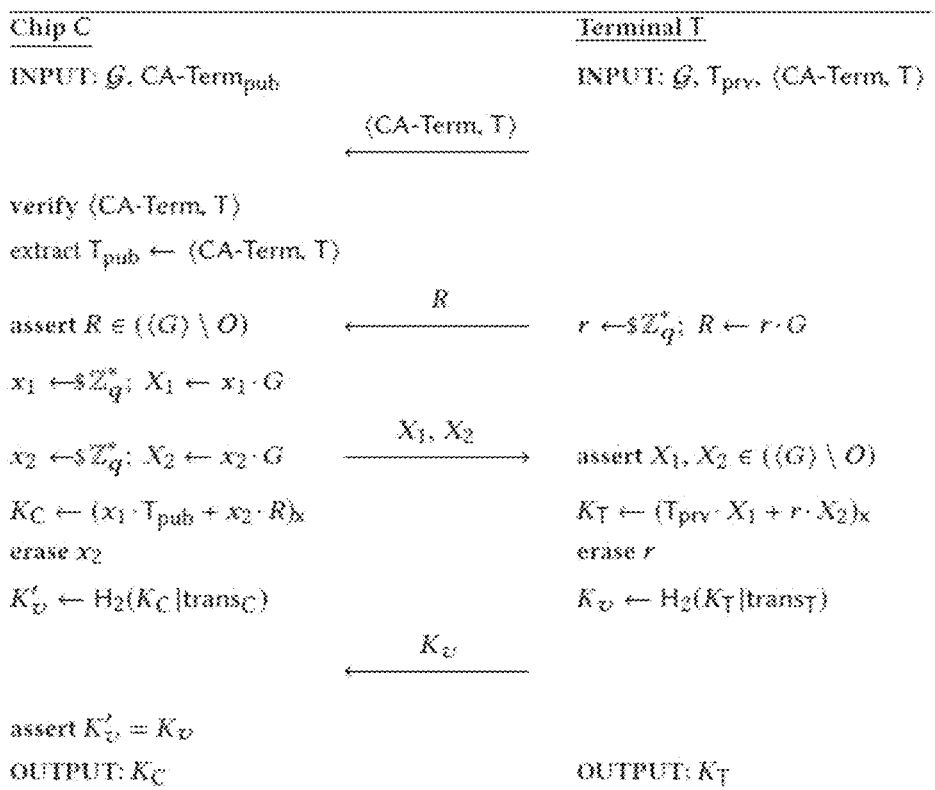
FIG. 3d schematically illustrates a strong access protocol.

Public-Key Infrastructures (PKI) are used to bootstrap trust among entities, as schematically illustrated on FIG. 3a.

In order to precisely define what each entity possesses, we use the following notation. We denote an entity with a capital letter, e.g. A. Then, the public, private keys of A are denoted respectively by $A_{pub}$, $A_{prv}$. When a higher level authority A issues a certificate for a lower level entity B, we denote this certificate by ⟨A,B⟩. With a slight abuse of notation, we extend the same notation to chains of certificates, e.g. ⟨A,C⟩ is a shorthand for the combination of ⟨A,B⟩ and ⟨B,C⟩.

Essentially, the header of ⟨A,B⟩ contains the public key $B_{pub}$, the signature issued by A, and metadata such as the expiration date, the subject identifier etc. according for example to the X.509 standard. Therefore, we assume the following three operations below can be performed on a given certificate chain ⟨A,B⟩:

verify the certificate, by "verify ⟨A,B⟩",
extract the public key, by "extract $B_{pub} \leftarrow$ ⟨A,B⟩",
extract the expiration date, by "extract $t_e \leftarrow$ ⟨A,B⟩".

The method of the invention may use the following PKIs:
Identity Signer PKI is managed by an autonomous authority whose task is to produce signatures for identity cards, e.g. the government. Then, the identity cards can prove the authenticity of the information they present to terminals.
CA-Ident is the root certificate authority, identity signers $IS_i$ are sub-authorities, and identity documents are leaf-level entities (see FIG. 1 for a generic PKI).
Terminal PKI issues/authorizes devices (called terminals) who support the same communication technology with chips in electronic identity objects.

Authorized terminals T can communicate with chips C in electronic identity objects and eventually decide whether the presented identity is valid or not.

CA-Term is the root certificate authority, terminal signers Term-$Sign_i$ are sub-authorities, and terminals T are leaf-level entities.

We also have the following entities:
The time server Time-Srv 42 is the entity whose task is to provide secure time information to electronic identity objects, so that the objects can check whether the certificate presented by the verification terminal T is still valid.
The confirmer device Cnf is a server acting as a third-party authority whose task is to check whether given message authentication code (MAC) is valid or not. It is trusted from the privacy perspective.
Chips C may comprise a small memory 21, on the order of few megabytes at most, and a small processor as computational unit 22. They store sensitive-information, such as a user identity and/or user biometric templates. They can communicate over contact or over a wireless interface with a verification terminal T. They may be powered by the verification terminal.
Verification terminals T (sometimes just referred to as terminals in this text) are devices who can read or verify the identity stored in electronic identity objects. They comprise a card reader (not shown), a computational unit 32 and (optionally) a biometric reading device 31.

Primitives

Hash Function, such as SHA256 hash functions. Each hash function is treated as an independent random oracle. Hence, we need to separate each of them with a fixed padding:

$$H_i(x):=\text{SHA256}(\text{encode}(i)|x)$$

where encode maps integer i to a single byte value.

Pseudorandom Function, Message Authentication Code. For MAC and PRF, the hash-based message authentication code HMAC can be used, where the underlying hash function is SHA256.

Authenticated Encryption. A (variable-length) authenticated encryption is a symmetric encryption scheme comprising two algorithms (Enc, Dec). Enc takes (K,IV,H,M) as input, that is a symmetric key K, initialization vector IV, authenticated header H and message M respectively, and returns a ciphertext C, such as a homomorphically encrypted biometric template 23. Dec takes (K,IV,H,C) as input and returns either a special failure symbol ⊥ or a message M.

Enc: (K,IV,H,M)→C
Dec: (K,IV,H,C)→M/⊥

Informally, the security of AE primitive boils down to confidentiality, integrity and authenticity of the communication. Namely, it is hard for an adversary who does not know the key K to forge a tuple (C,H) which is accepted by Dec. A practical choice for AE may be AES-GCM, which also provides a mode of operation for messages whose size is larger than one block.

Schnorr Signatures. The Schnorr signature scheme over $G=(p,a,b,G,G_2,G_3,q,h)$ is a tuple of algorithms (Kg,Sign, Ver) with arbitrary-length bitstrings as the message domain. Schnorr signatures are described in C. P. Schnorr, Efficient Identification and Signatures for Smart Cards, pages 239-252, Springer New York, New York, NY, 1990, the contents of which is hereby included by reference.

In FIG. 3b, sk, vk denote signing, verifying key pair respectively; σ denotes the signature. All algorithms have access to G. [R=R'] is a Boolean statement whose value is either true or false.

We refer to (vk,m,σ) as a valid Schnorr tuple if feeding it to Ver yields true. With the random oracle assumption, this signature scheme is existentially unforgeable with chosen message attack. The method for the Data & Chip Authentication Protocol may use a signature of Schnorr type. However, it is possible to use other elliptic-curve-based signature schemes for implementing PKis.

Internal Data Groups

Information stored in a memory 21 of a chip C in an electronic identity object may include for example fine-grained pieces that can be used to fully track a person, such as the date and the place of birth, the full name, and/or highly sensitive biometrics such as fingerprints or retina scans. At least some pieces of information are stored at enrolment and is never updated.

The information inside the chip C of the electronic identity object is categorized into few data groups. The determining factor is under which conditions and how they are revealed to a verification terminal T, and whether or not they carry privacy-sensitive data. Namely, the following data groups may be used:

$DG_1$: This group contains all necessary public parameters for the methods. Instead of receiving public parameters from the verification terminal T for each interaction, the chip C relies on this fixed data group in its internal memory 21 to prevent malicious parameter choice by terminals T. It does not contain any privacy-sensitive data that can be exploited for tracking.

$DG_2$: The data contained in this group is related to the basic identity information of the holder, such as his identity 24. It is revealed after the successful completion of either the Strong Access Control Protocol or the Weak Access Control Protocol. An unauthorized verification terminal T cannot read this data group.

$DG_3$: The data contained in this group is privacy-sensitive, e.g. reference biometric templates 23. It is only transmitted to the verification terminal T if the session is established through the Strong Access Control Protocol. The Weak Access Control Protocol is not sufficient to access this data group.

$DG_4$: The data contained in this group is highly privacy sensitive such as signatures of the identity, and never leaves the chip C in the electronic identity object.

Table 1 on FIG. 3c indicates the actual contents of the data groups. $DG_{2-3}$ is a shorthand for the combination of $DG_2$ and $DG_3$, and it is authenticated by the identity signer IS such that $\sigma_{DG2-3}$ is a Schnorr signature over $DG_{2-3}$.

Protocol Flow

Figure 2:
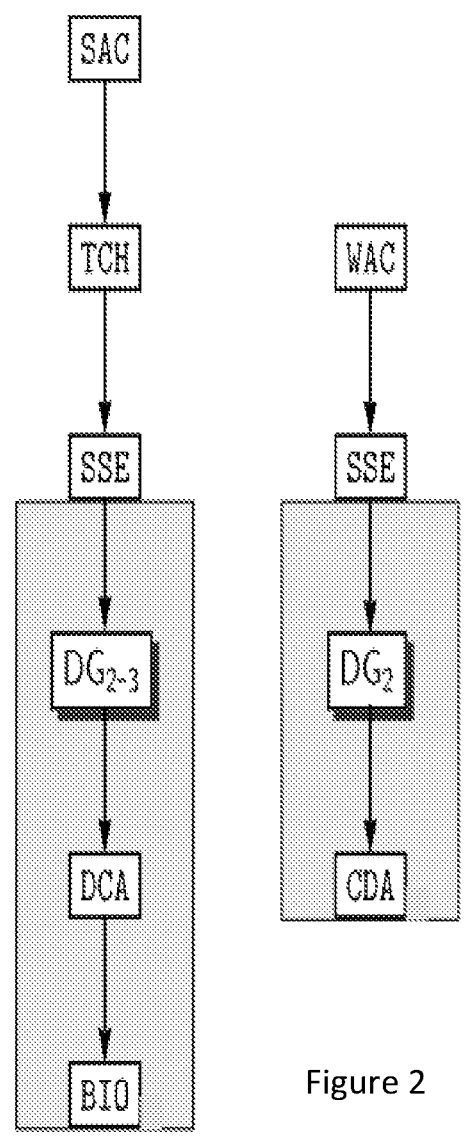
FIG. 2 shows a flow diagram of a method for recognizing and/or identifying a user, according to the invention.

The internal ordering of the protocols as shown in FIG. 2. Two modes of operation exist, namely strong and weak paths, as illustrated in left and right flows respectively.

When an electronic identity object with a chip C enters into close proximity of a verification terminal T, it is powered on by the terminal. The control flow can follow either the strong or the weak path based on the choice of the verification terminal T. If any party in the following interaction encounters an error, then the whole session is aborted immediately.

The strong path continues in the following order:

SAC: the chip C proceeds to verify the authorization of the verification terminal T. On success, both C and T end up deriving a shared secret key material K.

TCH: C requests a reliable time information from a time server 42 (Time-Srv). The communication between the two is relayed through T.

SSE: C and T uses the shared key material K to establish secure communication. After this protocol, any following interaction between the two is encrypted.

$DG_{2-3}$: C transfers $DG_2$ and $DG_3$ to T.

DCA: C proves the authenticity of $DG_{2-3}$. This proof also ensures that the chip C is genuine.

BIO: T checks if a real-time biometric template captured with a biometric sensor 31 matches a reference biometric template 23 included in $DG_3$ by running a biometric matching algorithm. On success, T successfully accepts the presented identity and terminates the session.

The weak path continues in the following order:

WAC: The chip C proceeds to verify the weak authorization of the verification terminal T based on a knowledge of a password. On success, both C and T end up deriving a shared secret key material K.

SSE: Same as in the strong path.

$DG_2$: C transfers only $DG_2$ to T (but not $DG_3$).

CDA: C proves the authenticity of $DG_2$ with a confirmer-based proof. The verification terminal T terminates after receiving the proof. Later, the verification terminal T needs to interact with the remote confirmer device Cnf and verify the authenticity of the presented proof. On success, the verification terminal T concludes that the presented identity was valid. The terminal T never receives access to $DG_3$ in this path and no biometric matching is made.

In the strong path, the chip C of the electronic identity object ensures that the interacting verification terminal T is authorized by the identification system 1 and its certificate is not revoked/expired. This allows the chip C to trust the verification terminal T and release its identity 24 and its biometric reference template 23 for biometric matching. On the other side, the verification terminal T ensures that the identity information on the chip C is valid, that the chip is authentic (not a skimmed copy) and that the holder's biometric identity matches the one 24 carried by the chip. The strong path requires an online connectivity between the terminal T and a time server 42.

The weak path provides a more lightweight solution and does not require the verification terminal T to have online connection to the time-server 42 or to an authentication/revocation server 41 during the interaction. The chip C in the electronic identity object ensures that the verification terminal T has a visual access to a front page/side of the electronic identity object, for example with a camera or scanner and OCR program, and thereby knows the password. This does not necessarily mean that the verification terminal T is authorized by the identification system 1. It could be a rogue device who had access to the front page or to a copy of the front page of the electronic identity object. Therefore, the chip C shares its identity information 24 with the verification terminal T along with the confirmer verifiable proof of the identity. Also, the chip C does not release its biometric template 23. On the other side, the terminal T cannot decide on the validity of the identity information by itself. It might be interacting with a device who is imitating to be a valid electronic identity object. The terminal T keeps the offline proof and later requests from the confirmer device Cnf to verify the proof. Only when the confirmer device Cnf validates the proof, the verification terminal T is fully convinced that the presented identity was valid, and the interacting electronic identity object was genuine. There is however no guarantee that the holder's biometric identity matches the one carried by the chip C in the electronic identity object.

Strong Path

Strong Access Control (SAC)

Given the current wide-spread use of NFC-enabled smart phones, attackers have a large number of devices that can be exploited and coerced to act as verification terminals T. Therefore, any type of contactless card or chip or other electronic identity object without proper access control is exposed to any device that is in close proximity. The basic pillar of privacy can be attained only through an access-control mechanism which prevents malicious devices from communicating with the object.

When a verification terminal T prompts a chip C in an electronic identity object to establish a communication session, the terminal T is asked to provide a chain of valid certificates as an attestation. On failure, the electronic identity object refuses to communicate and aborts. On success, both the chip C and the verification terminal T end up with a shared secret, that is the key material for the following symmetric session. Hence, the access control protocol serves two purposes: (1) the chip C in the electronic identity object is convinced that it is talking to an authorized terminal T, (2) the chip C and the terminal T derive the key material that is used for encrypting mutual exchanges during the session.

The underlying Terminal PKI consists of the root certificate authority CA-Term, and terminals T as the leaf-level entities. The chip C in the electronic identity object comes embedded with the public signature of the root certificate authority CA-Term$_{pub}$, so it can determine whether the given chain ⟨CA-Term,T⟩ is valid.

It can be shown that: (1) a passive adversary cannot distinguish the derived session key from random, and (2) an active adversary cannot make the electronic identity object accept by modifying the exchanged messages. The final derived key material remains secure even if T$_{prv}$ is given to the adversary after the protocol is completed. An example of such protocol is shown on FIG. 3d.

Time Check Protocol (TCH) & Revocation Check Protocol (REV)

In practice, it is a challenging task to protect frequently used longterm secret keys against compromise. For terminals, the secret key is T$_{prv}$, which permits communication to all electronic identity objects in the system. A single failure leads to a wide-scale collapse of the privacy goals.

First remedy is the revocation-through-time. The validity of issued certificates is restricted to a limited amount of time. For instance, the validity interval of ⟨CA-Term,T⟩ can be up to few weeks. A wide-scale collapse can then be prevented by gradually phasing out the old certificates with new ones. The compromised certificates remain useful only for a short period of time.

Figure 3E:
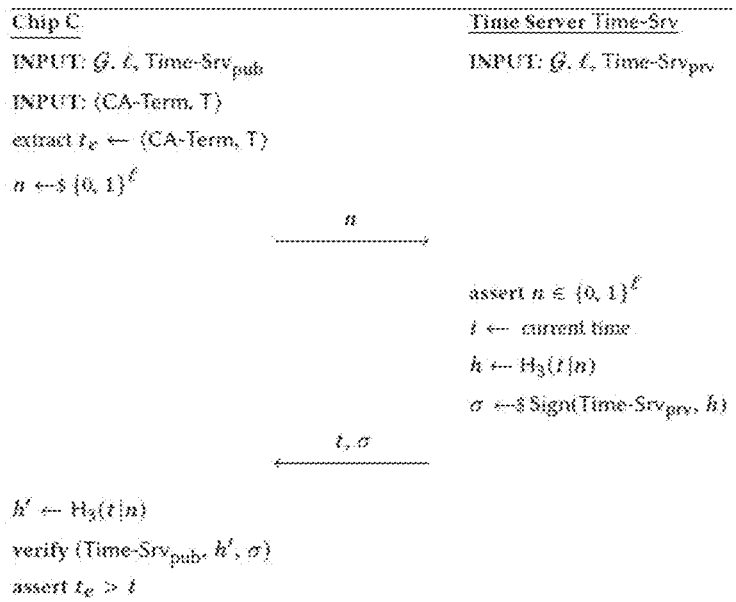
FIG. 3e schematically illustrates a possible time check protocol.

The only thing that is required by the electronic identity object is a trusted clock to gradually expire certificates. Nevertheless, the electronic identity object cannot rely on its internal clock, as it is only powered during the interaction with verification terminals. Therefore, a time-server 42 is deployed, upon which the chip C can rely to obtain the current time value. A possible time check protocol is shown on FIG. 3e.

After successfully completing strong access control, the chip C in the electronic identity object prompts the terminal T with a challenge value n to produce a signed timestamp value t. Terminal T acts as a proxy, relaying the communication between C and the time server 42. Then, the time server 42 provides a signature over the timestamp t and the nonce n to prevent replay attacks.

Figure 3F:
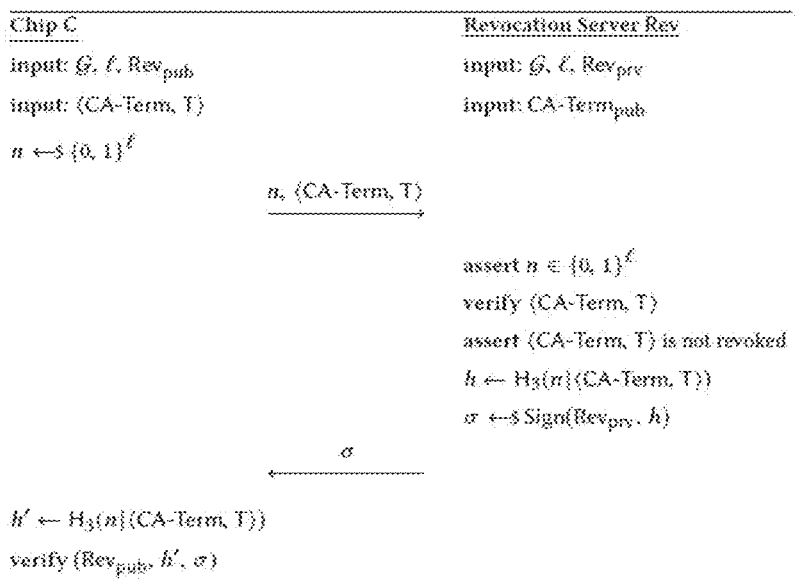
FIG. 3f schematically illustrates a possible revocation check protocol.

Alternatively, an OCSP-based approach may be used to check the revocation status of certificates with a Revocation Check Protocol. In this case, a revocation server 41 called Rev is used, whose public key is stored in the chip C at enrolment time. Using REV instead of TCH also allows to outsource the verification of the certificate chain ⟨CA-Term, T⟩ in SAC and save 2dr scalar multiplications by trusting the revocation server 41. A possible revocation check protocol is shown on FIG. 3f.

Secure Communication (SSE)

A symmetric session protocol SSE between the chip C and the verification terminal T allows them to exchange messages of arbitrary length in a bidirectional manner. In practice, this will be used by the chip C to securely transfer data groups to the terminal T, as well as to encapsulate any protocol interactions between C and T following a successful key exchange.

C and T together reach to the point of establishing a secure session when they succeed on deriving a shared key material, denoted respectively by K$_C$, K$_T$ in both SAC and WAC. We denote both by K as they are supposed to be equal on success. Then, a secure session based on K is created. A secure session means:

(1) The messages from the verification terminal T to the chip C is authenticated and confidential.

(2) The messages sent from the chip C to the verification terminal T is authenticated and confidential. Since C has not used any authentication data during the key agreement protocol, T does not know who it is talking to. However, the verification terminal T is assured that the messages it receives originate from the peer who established the session.

(3) The integrity of the messages in the session is ensured, i.e. no active adversary can modify, discard, replay, forge or change the order of the messages.

A variable-length authenticated encryption scheme AE which consists of two algorithm (Enc, Dec) is preferably used, as illustrated on FIG. 3g. Each peer keeps an active state st=(K$_{AE}$, i$_0$, i$_1$) for the live session where K$_{AE}$ is the authenticated encryption/decryption key, and i$_0$, i$_1$ are nonce counters for each sent and received messages respectively. A peer has access to the pair of algorithms Send and Recv. Send takes (st,M) as input and returns (st,C), i.e. each send/receive updates the corresponding internal counter of the state. Similarly, Recv takes (st,C) and returns (st,M). Authenticated header in not used (so we put ⊥ as input below). In case of M=⊥, the receiver halts. The full description is given below:

The initial state st is bootstrapped with algorithm Init$_b$ (FIG. 3h) which takes the key material K as input. The order of counters is swapped to synchronize the initial states. Hence, C runs Init$_0$ and T runs Init$_1$.

On FIG. 3h, encode is a byte-encoding function; $\bar{b}$ is the complement of b such that $\{b, \bar{b}\}=\{0,1\}$:

Data & Chip Authentication (DCA)

Data Authentication.

In order to provide a secure identification, the verification terminal T should accept the presented identity of a chip C as valid and grant access to the underlying service only if the claimed identity is indeed genuine. Namely, a chip C is obliged to prove to the terminal T that the claimed identity carries some sort of authentication data, e.g. MAC, a signature etc. We refer to it as data authentication. More specifically, the authenticated data is the concatenation of two data groups DG$_{2-3}$=DG$_2$|DG$_3$.

Figure 3I:
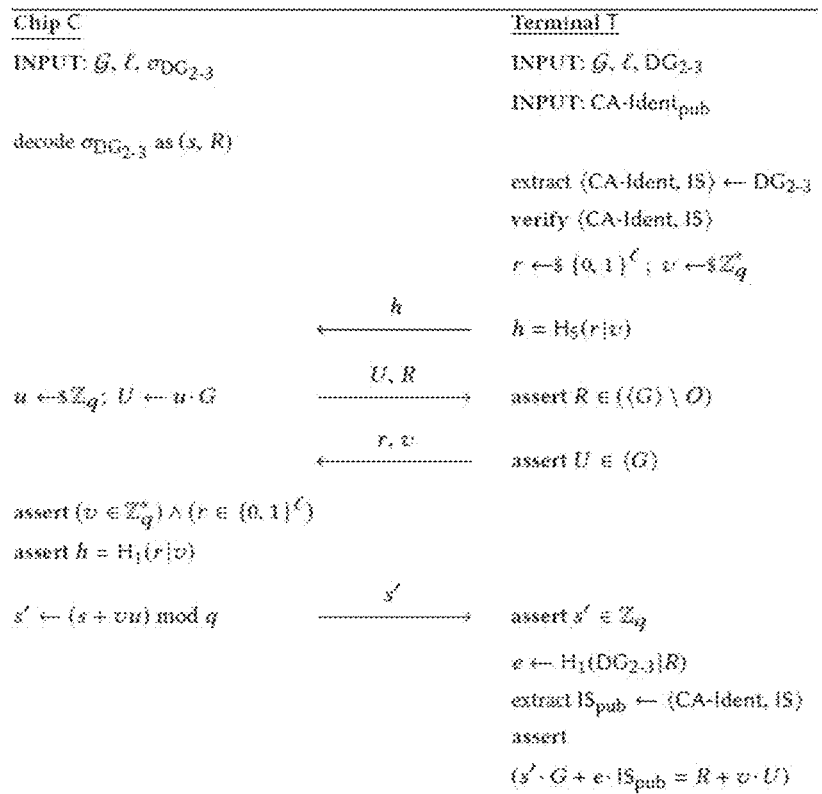
FIG. 3i schematically illustrates a possible interactive zero-knowledge protocol.

An interactive zero-knowledge protocol is preferably used for proving the authenticity of the presented identity. In a preferred embodiment illustrated on FIG. 3i, the chip C stores a Schnorr tuple (IS$_{pub}$,DG$_{2-3}$,σ$_{DG2-3}$) along with the certificate chain ⟨CA-Ident,IS⟩. The verification terminal T knows CA-Ident$_{pub}$ in advance, and also receives DG$_{2-3}$. Then, C and T follow the interaction below:

in which the chip C proves the knowledge of a valid signature, that is

σ$_{DG2-3}$. σ$_{DG2-3}$ has two components s and R. During this interaction, the component R of the signature σDG$_{2-3}$=(s, R) is revealed to the verifier (Terminal T) in clear; a non-transferable proof of knowledge of a valid s is made. This allows to develop a very efficient Σ-protocol, which yields a zero-knowledge proof of knowledge interactive protocol with a commitment scheme under the random oracle assumption.

Preferring interactive proofs over signature schemes has two benefits in this scenario. First, the transcript remains deniable from the chip's perspective, hence he can later deny the interaction, even if the transcript is released by the terminal. Secondly, the actual signature is never released to the verification terminal, which prevents the terminal from obtaining publicly-provable and transferable proof over the identity.

Chip Authentication.

Although one can simply prove the authenticity of the identity with digital signatures or MACs, there is no guarantee that the chip C in the electronic identity object is actually the genuine one. For instance, if the content of chips can be read and the signature $\sigma_{DG2-3}$ can be extracted, then it can be skimmed too. Each skimmed copy would successfully convince the terminal of its validity, since $\sigma_{DG2-3}$ remains intact. Ideally, only one single chip can convince terminals. The proposed method relies on secure memory assumption of the chip C, that is the chip contains a memory region that is inaccessible from outside.

A solution is to generate a signature key pair (sk,vk) such that sk is placed in the secure memory and vk is transmitted to the terminal and verified through an external PKI, as done in the MRTD. C then proves the knowledge of sk to T by signing an arbitrary message. This is a bad solution for two reasons: it allows the terminal T to obtain a transferable proof from the terminal and it requires an additional PKI.

The same level of protection against copying can be achieved by placing the signature $\sigma_{DG2-3}$ of the authenticated data into the secure memory portion of the chip C. Because $\sigma_{DG2-3}$ never leaves the chip and its possession is proven with the zero-knowledge protocol, DCA also helps the chip prove its authenticity.

Weak Path

Weak Access Control (WAC)

Even though the information released in the weak access control path will be minimal, no malicious device or terminal should be able to talk to the chips C in the electronic identity object, nor listen to the communication between the authorized terminal and the chip. The above-mentioned SAC tackled this issue through a PKI.

An alternative way of ensuring that a connection attempt is from an authorized terminal T is to use a knowledge of a password. This is done with PACE in the MRTD standard. The password usually lays printed on the document and can be either typed manually by the inspector or directly read with visual scanning of the document.

In password-based access control protocols, passwords are chosen from a small domain, and it is feasible for an adversary to enumerate each possible password in this set. Therefore, the adversary always has an inevitable not negligible chance of guessing the password. In terms of security, the usual expectations from such protocols are:

An adversary who obtains multiple execution transcripts of the protocol should not be able to eliminate any candidate password from the set.

An adversary who is performing an active attack should only eliminate a single candidate password from the domain, and strictly no more. In other words, the best strategy for an active adversary is to pick a random guess from the password domain and see if the protocol successfully completes.

Figure 3J:
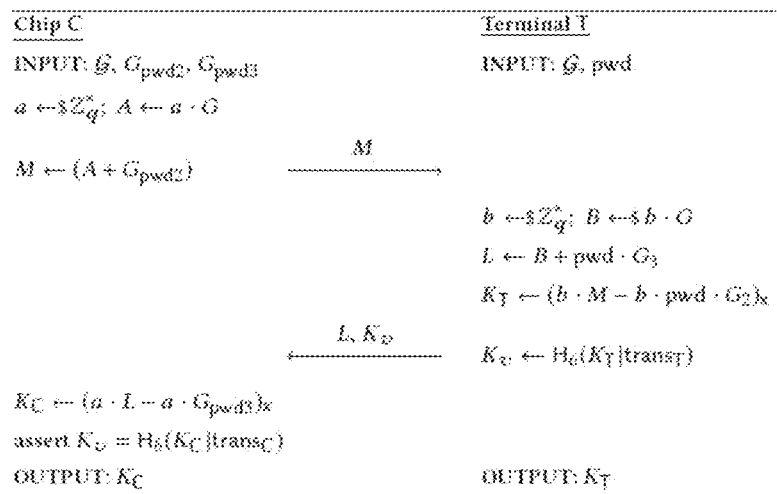
FIG. 3j schematically illustrates a possible a weak access protocol.

We specify the dictionary D as the password domain such that $\log_2|D|$ is far smaller than the security parameter A. Each chip receives a randomly sampled password pwd∈D at enrollment. A possible protocol is illustrated on FIG. 3j.

Confirmer Data & Chip Authentication (CDA)

After a weakly secure session is established, the chip C of the electronic identity object releases $DG_2$. In order to convince the verification terminal T, without any publicly-verifiable proof of valid identity, the chip C produces a MAC that can only be verified by the confirmer device Cnf. Therefore, without the help of the confirmer device, the verification terminal T can only learn the basic identity information without any proof.

The confirmer device Cnf of the invention is a server which is in possession of a master secret $K_{Cnf}$ that is sampled uniformly from the key domain of the pseudorandom function PRF. During enrollment, each chip C receives a unique identity and key pair ($u_{chip}$, $K_{chip}$) from the confirmer device Cnf such that $K_{chip}$=PRF ($K_{Cnf}$, $u_{chip}$). When the chip C and the verification terminal T interact, both of them add nonces to the protocol to guarantee freshness. By using timestamps, the terminal T commits to a specific time interval, i.e. [t,t+Δt], in which the authentication code will be useful. On the other side of the MAC verification, the confirmer device decides on the value of Δt and applies this time interval policy.

Figure 3K:
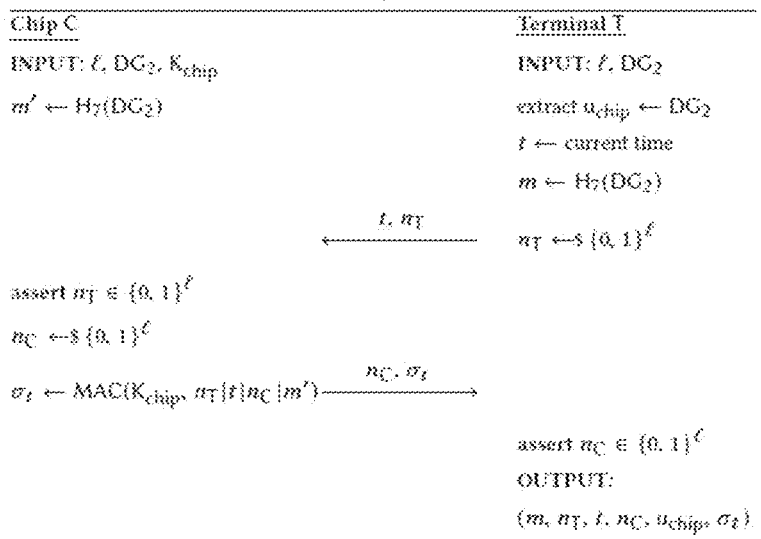
FIG. 3k schematically illustrates a Confirmer Data & Chip Authentication (CDA) protocol.
Figure 3L:
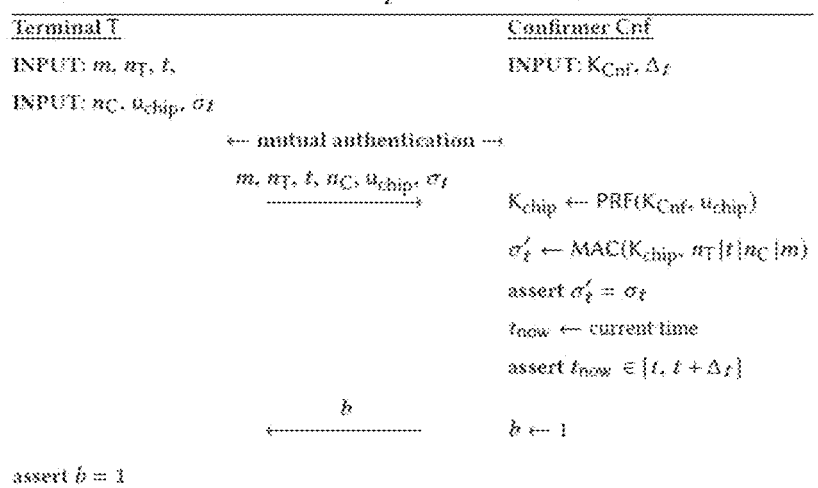
FIG. 3l schematically illustrates a Confirmer Data & Chip Authentication (CDA) protocol.

Possible CDA protocols are illustrated on FIGS. 3k and 3l. It allows weakly transferable proofs from the terminal side, but they are not publicly verifiable. Moreover, the confirmation protocol makes sure that a certain terminal can be kept accountable for verification requests.

The secret $K_{chip}$ is preferably stored into a secure portion of the memory 21 of the chip C to obtain chip authentication at the same time. Since $K_{chip}$ never leaves the chip C, a terminal T who verifies the validity of this offline proof can also be convinced that it was interacting with the genuine chip.

Additional Features and Terminology

The proposed method can rely on low-cost, computationally-restrained (personal) cards, such as smart cards (also called chip card or integrated circuit card-ICC), i.e. a physical electronic authorization device, typically in form of a plastic credit card sized card, with an embedded integrated circuit C being configured to communicated with a terminal T by means of galvanic contacts or over a wireless interface, such as NFC for example.

Although examples provided herein may have been described in the context of a system comprising a verification terminal cooperating with an electronic identity object including an embedded chip, one or more features may further apply to other types of systems and to other types of objects, including objects having more than one chip or components.

Depending on the embodiment, certain acts, events, or functions of any of the algorithms described herein can be performed in a different sequence, can be added, merged, or left out altogether (for example, not all described acts or events are necessary for the practice of the methods). Moreover, in certain embodiments, acts or events can be performed concurrently, for instance, through multi-threaded processing, interrupt processing, or multiple processors or processor cores or on other parallel architectures, rather than sequentially. In addition, different tasks or processes can be performed by different machines or computing systems that can function together.

The various illustrative logical blocks, modules, and algorithm steps described herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, a microprocessor, a state machine, a digital signal processor (DSP), an application specific integrated circuit (ASIC), a FPGA, or other programmable logic device, discrete gate or transistor logic, discrete hardware components, or any combination thereof designed to perform the functions described herein. A hardware processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

"Servers" of "devices", such as the confirmer device, can be implemented or performed by a physical machine, a virtual server, a general-purpose computer, multiple servers, cloud based computational resources, or other programmable components or modules providing the services and methods described.

Unless described otherwise, "links" and "connections" can be provided by any short-distance protocol, including near Field Communication (NFC), Bluetooth, ZigBee, etc, local protocol, such as WLAN, Ethernet, etc, or long-distance protocol, including for example Internet or cellular networks.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

LIST OF REFERENCES

1 Authorization/identification system
C Chip in the electronic identity object
21 Memory
22 Computational module
23 Reference biometric template
24 Identity
25 Encryption module
26 Verification module
27 Transmission module
28 Homomorphic encryption module
T Verification terminal
31 Biometric unit
311 Data link
32 Computational module
33 Encryption module
34 Preprocessing module
35 Feature extraction module
36 Matching module
37 Transmission module
38 Digital identity receiving module
39 Authenticity verification module
4 Servers
41 Authorization and/or revocation server
42 Time server
90 User finger
Cnf Confirmer device
K, $K_{chip}$ Secret

The invention claimed is:

1. A method for recognizing and/or identifying a user with a chip in an electronic identity object storing a digital identity,
the method comprising steps of:
establishing a wireless or electrical connection between the electronic identity object and a verification terminal;
verifying, in the electronic identity object, if the verification terminal is authorized to communicate with the electronic identity object, and in response of a positive verification sharing a secret:
using the shared secret for establishing an encrypted symmetric data link between the electronic identity object and the verification terminal;
transmitting, through the encrypted data link, said digital identity stored in the electronic identity object to the verification terminal; and
verifying in the verification terminal the authenticity of said digital identity,
acquiring, in the verification terminal, a biometric template of the user; and
verifying in the verification terminal if the acquired biometric template matches a biometric template stored in the electronic identity object, and encrypting, in the electronic identity object, the biometric template using a homomorphic encryption so as to generate a homomorphically encrypted biometric template.

2. The method of claim 1, further comprising a step of verifying in said verification terminal the authenticity of the electronic identity object.

3. The method of claim 1, comprising:
transmitting the homomorphically encrypted biometric template to the verification terminal over the encrypted data link;
matching, in the verification terminal, the acquired biometric template with the homomorphically encrypted biometric template so as to generate an homomorphically encrypted result;
transmitting the homomorphically encrypted result to the electronic identity object through the encrypted data link;
decrypting, in the electronic identity object, the homomorphically encrypted result so as to obtain a matching result; and
transmitting the matching result to the verification terminal through the encrypted data link.

4. The method of claim 1, comprising:
transmitting the acquired biometric template to the electronic identity object through the encrypted data link;
matching, in the electronic identity object, the biometric template with the biometric pattern so as to generate the matching result; and
transmitting the result of the matching to the verification terminal through the encrypted data link.

5. The method of claim 1, wherein the acquisition of the biometric template comprises prompting the user to present a body portion to a biometric unit;
the body portion being an upper member of the body, notably a finger, a wrist or a hand; and
the biometric template corresponding to a fingerprint or a subcutaneous veins pattern.

6. The method of claim 1, wherein the verification of the authenticity of the electronic identity object and/or of the digital identity comprises:
providing to the verification terminal a signature generated from a secret stored in the electronic identity object, the secret being assigned to the electronic identity object by a confirmer device; and
querying the confirmer device to provide, to the verification terminal, a validity of the provided signature.

7. The method of claim 6, wherein said signature is generated based on an identity stored in the electronic identity object, the identity being assigned to the electronic identity object by the confirmer device.

8. The method of claim 1, wherein said step of verifying if the verification terminal is authorized comprises:
verifying, in the electronic identity object, whether the verification terminal knows a shared secret.

9. The method of claim 8, said electronic identity object being a document or smart card with an embedded chip, the method further comprising:
acquiring, in the verification terminal, the shared secret by optically and/or electrically and/or electromagnetically reading a surface of the electronic identity object.

10. The method of claim 1, wherein said step of verifying if the verification terminal is authorized comprises:
prompting the verification terminal to provide to the electronic identity object an authorization certificate;
verifying, in the electronic identity object, a validity of the provided authorization certificate by:

verifying a signature of the authorization certificate provided by a trusted server, said signature being an elliptic-curve based signature; and/or
verifying an expiration date of the authorization certificate by acquiring, in the electronic identity object, a time information, notably provided by a time server.

11. An electronic identity object comprising a chip with following modules or elements:
a transmission module over which a connection with a verification terminal can be established;
a verification module for verifying if a connected verification terminal (T) is authorized to communicate with the electronic identity object, and in response of a positive verification sharing a secret:
an encryption module arranged for establishing an encrypted symmetric data link that uses the shared secret between the electronic identity object and the verification terminal;
a memory for storing a digital identity;
the transmission module being arranged for transmitting, through the encrypted data link, said digital identity to the verification terminal, and
a homomorphic encryption module for homomorphically encrypting said biometric template and for decrypting a matching result, said homomorphic encryption module:
transmitting the homomorphically encrypted biometric template to the verification terminal over the encrypted data link;
receiving a homomorphically encrypted result through the encrypted data link;
decrypting, in the electronic identity object, the homomorphically encrypted result so as to obtain a matching result; and
transmitting the matching result to the verification terminal through the encrypted data link.

12. The electronic identity object of claim 11, further comprising a biometric template.

13. The electronic identity object of claim 11, said memory storing a secret assigned by a confirmer device.

14. The electronic identity object of claim 11, further arranged for verifying whether a connected verification terminal knows a shared secret.

15. A verification terminal for recognizing and/or identifying a user with an electronic identity object,
the verification terminal comprising:
a transmission module for establishing a wireless or electrical connection with the electronic identity object;
an encryption module for establishing an encrypted symmetric data link with said electronic identity object;
a receiving module for receiving, through the encrypted data link, a digital identity stored in the electronic identity object; and
a verification module for verifying the authenticity of said digital identity,
a matching module for verifying if an acquired biometric template matches a biometric template stored in the electronic identity object, wherein:
the matching module is arranged for matching the acquired biometric template with an homomorphically encrypted biometric template so as to generate an homomorphically encrypted result;

said transmission module being further arranged for transmitting the homomorphically encrypted result to the electronic identity object through the encrypted data link.

16. An electronic identity object comprising a chip with following modules or elements:
a processor configured to execute instructions from a memory to cause the system to provide:
a transmission module over which a connection with a verification terminal can be established;
a verification module for verifying if a connected verification terminal (T) is authorized to communicate with the electronic identity object, and in response of a positive verification sharing a secret:
an encryption module arranged for establishing an encrypted symmetric data link that uses the shared secret between the electronic identity object and the verification terminal;
the memory storing a digital identity;
the transmission module being arranged for transmitting, through the encrypted data link, said digital identity to the verification terminal, and
a homomorphic encryption module for homomorphically encrypting said biometric template and for decrypting a matching result, said homomorphic encryption module:
transmitting the homomorphically encrypted biometric template to the verification terminal over the encrypted data link;
receiving a homomorphically encrypted result through the encrypted data link;
decrypting, in the electronic identity object, the homomorphically encrypted result so as to obtain a matching result; and
transmitting the matching result to the verification terminal through the encrypted data link.

17. The electronic identity object of claim 16, further comprising a biometric template.

18. The electronic identity object of claim 16, said memory storing a secret assigned by a confirmer device.

19. The electronic identity object of claim 16, further arranged for verifying whether a connected verification terminal knows a shared secret.

20. A verification terminal for recognizing and/or identifying a user with an electronic identity object, the verification terminal comprising:
a processor configured to execute instructions from a memory to cause the system to provide:
a transmission module for establishing a wireless or electrical connection with the electronic identity object;
an encryption module for establishing an encrypted symmetric data link with said electronic identity object;
a receiving module for receiving, through the encrypted data link, a digital identity stored in the electronic identity object; and
a verification module for verifying the authenticity of said digital identity,
a matching module for verifying if an acquired biometric template matches a biometric template stored in the electronic identity object, wherein:
the matching module is arranged for matching the acquired biometric template with an homomorphically encrypted biometric template so as to generate an homomorphically encrypted result;
said transmission module being further arranged for transmitting the homomorphically encrypted result to the electronic identity object through the encrypted data link.

* * * * *